Feb. 16, 1943.  F. E. WALLING  2,311,422
JANITOR'S CART
Filed Oct. 21, 1941  2 Sheets-Sheet 1

Inventor
Frank E. Walling

By Clarence A. O'Brien

Attorney

Feb. 16, 1943.   F. E. WALLING   2,311,422
JANITOR'S CART
Filed Oct. 21, 1941   2 Sheets-Sheet 2

Inventor
Frank E. Walling

By Clarence A. O'Brien
Attorney

Patented Feb. 16, 1943

2,311,422

UNITED STATES PATENT OFFICE 2,311,422

JANITOR'S CART

Frank E. Walling, Portland, Oreg., assignor of one-half to John W. Walling, Amity, Oreg.

Application October 21, 1941, Serial No. 415,959

1 Claim. (Cl. 280—50)

This invention relates to new and useful improvements in utility conveyances, and more particularly to a cart for the convenience of janitors, charwomen and the like, who must take various implements such as mops, sweepers, brooms, et cetera, from room to room when cleaning.

The principal object of the present invention is to provide a cart upon which various cleaning implements can be readily carried and upon which a trash bag for the collection of trash from wastebaskets and the like can be conveniently supported.

These and other objects and advantages of the invention will become apparent to the reader of the following specification.

Figure 1:
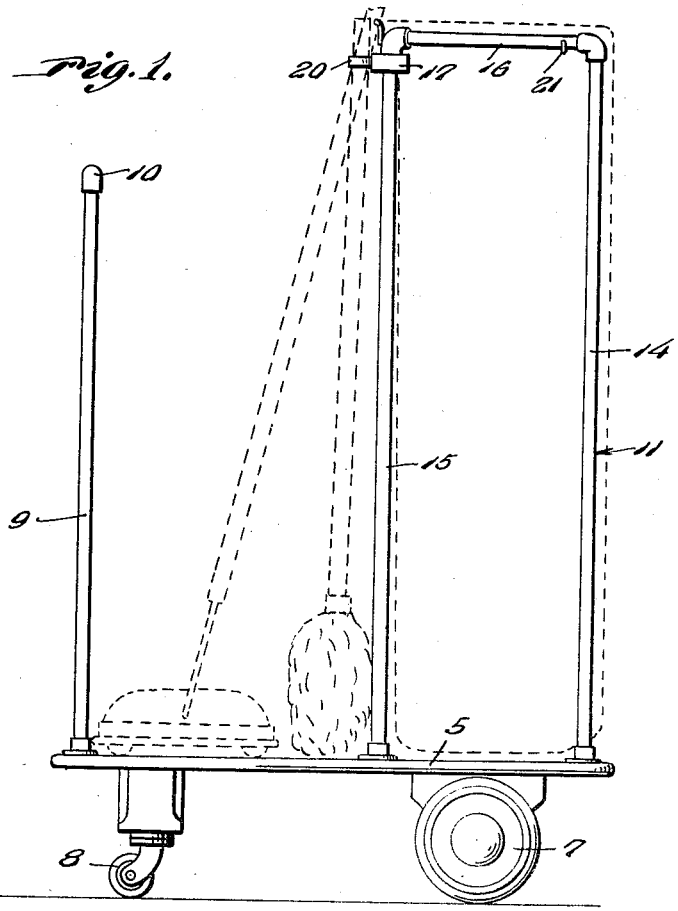
Figure 1 represents a side elevational view.

Referring to the drawings wherein like numerals designate like parts, it can be seen that the invention comprises a platform 5 having a rubber or other cushioned bead 6 around its perimeter to prevent the marring of furniture and other structures. The platform 5 is supported by a pair of wheels 7, 7 and a caster wheel 8, permitting convenient steering of the cart.

A convenient means for pushing the cart consists of a pair of upstanding posts 9 at one end of the platform 5 connected by a hand bar 10 at the upper ends thereof.

A rack structure 11 is provided for the support of a trash collection bag 12. This bag 12 has eyes 13 at the upper edge portion thereof.

The rack 11 comprises a pair of vertically extending bars 14, 14 and bars 15, 15. At each side of the platform 5 the bars or posts 14, 15 are connected by a horizontal member 16 at the upper ends thereof. A fixture bar 17 connects the upper end portions of the posts 15, 15 and has thereon spring fingers 18, hook 19 and holders 20 for holding the handles of sweepers, mops, brooms and other implements which can rest on the platform 5.

Figure 2:
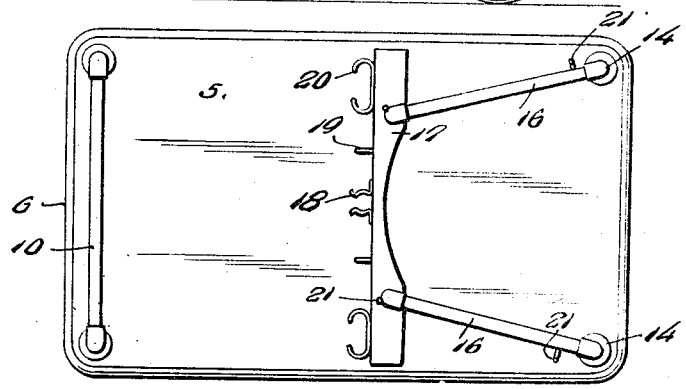
Figure 2 is a top plan view.
Figure 3:
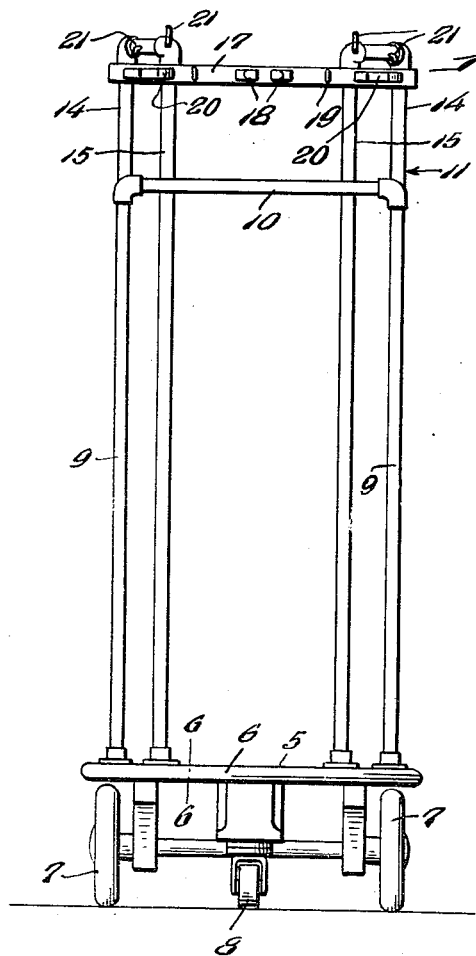
Figure 3 is a front elevational view.
Figure 4:
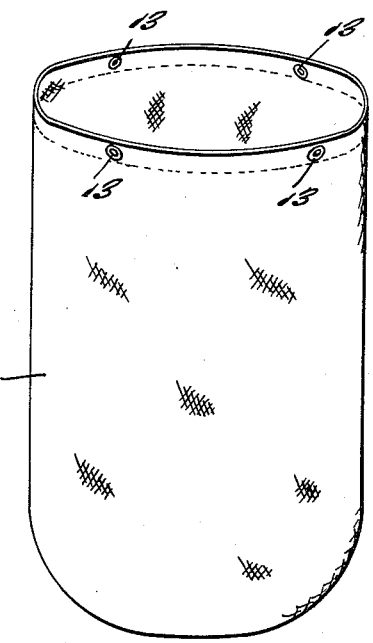
Figure 4 is a perspective view of the trash collecting bag.
Figure 5:
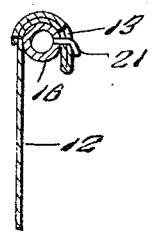
Figure 5 is a fragmentary vertical sectional view through the upper portion of the bag supporting rack with a bag supported thereon.
Figure 6:
Figure 6 is a fragmentary detailed sectional view taken substantially on line 6—6 of Figure 3.

Hooks 21 are provided on the horizontal members 16 and also at the upper ends of the posts 15 and over these can be disposed the eyes 13 for supporting the bag 12 within the rack structure 11. Obviously, this bag can be taken from the rack and dumped very conveniently in view of the fact that the back portion of the rack is entirely open. This facility is enhanced by the fact that the bars 14, 14 are also further apart than the front bars 15, 15, as is apparent in Figure 2.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A push cart of the class described comprising an elongated wheel supported platform, a trash bag, and means to suspend said bag above said platform comprising a rack upstanding from one end of the platform and including a pair of corner uprights arising from said one end of the platform, a second similar pair of uprights spaced apart transversely of the platform intermediate the ends thereof and closer together than the corner pair, a pair of horizontal side tie members connecting the upper ends of the corner uprights with the upper ends of the second pair of uprights whereby said members diverge toward said one end of the platform, an upper cross-bar connecting the upper ends of the second pair of uprights and adapted for the suspension of articles thereto, and a pusher yoke arising from the other end of said platform, said tie members having hooks thereon for suspending the bag therefrom.

FRANK E. WALLING.